Nov. 8, 1960

H. W. FEDDE 2,959,244

SCAFFOLD TRUCK

Filed Oct. 16, 1956

Harry W. Fedde
INVENTOR.

BY *Clarence A. O'Brien*
*and Harvey B. Jackson*
Attorneys

Nov. 8, 1960  H. W. FEDDE  2,959,244
SCAFFOLD TRUCK
Filed Oct. 16, 1956  3 Sheets-Sheet 2

Harry W. Fedde
INVENTOR.

Nov. 8, 1960 H. W. FEDDE 2,959,244
SCAFFOLD TRUCK
Filed Oct. 16, 1956 3 Sheets-Sheet 3
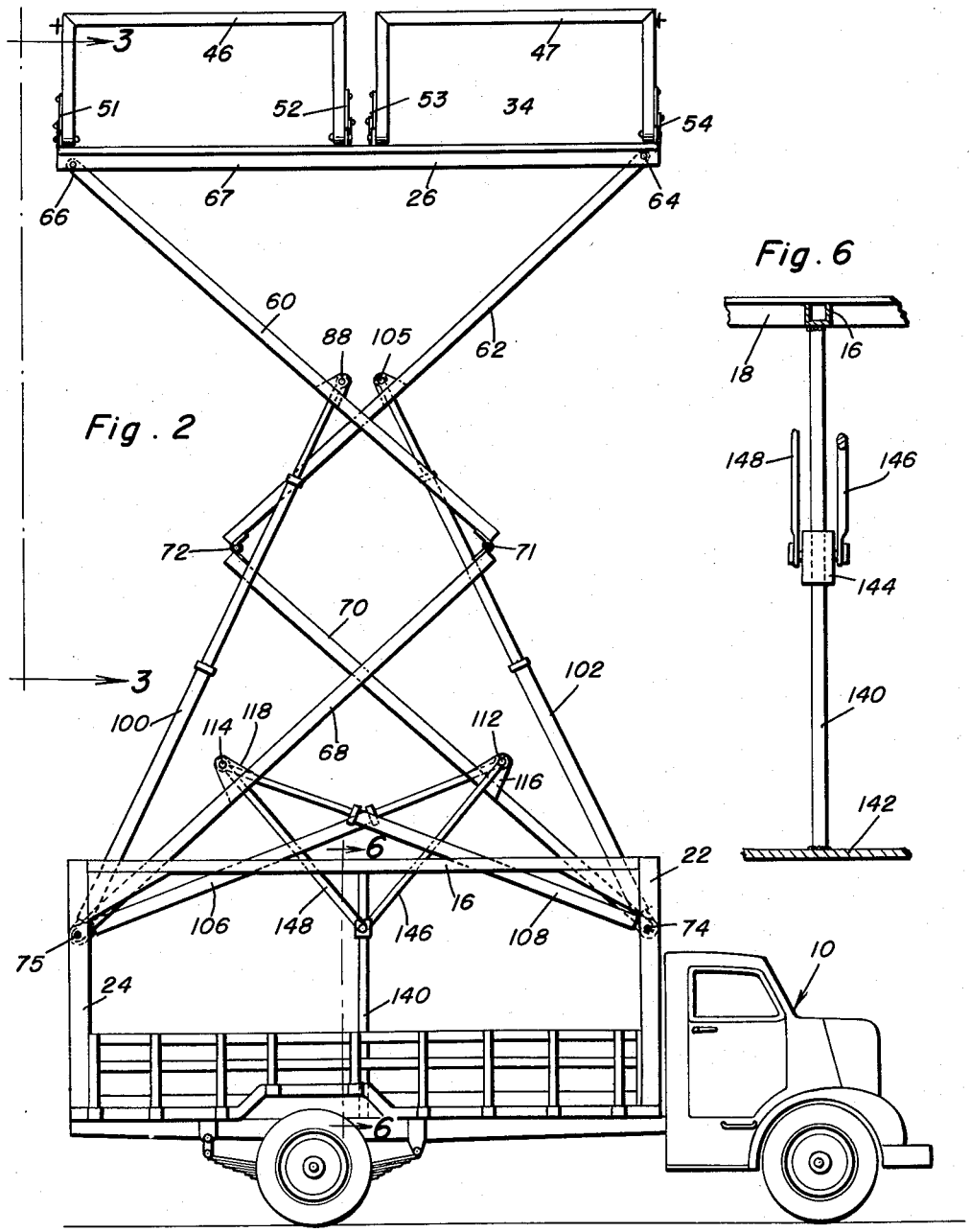
Harry W. Fedde
INVENTOR.

United States Patent Office 2,959,244
Patented Nov. 8, 1960

2,959,244

SCAFFOLD TRUCK

Harry W. Fedde, 2809 NW. Park Place, Oklahoma City, Okla., assignor of fifty percent to Randall H. Sharpe, Oklahoma City, Okla.

Filed Oct. 16, 1956, Ser. No. 616,213

2 Claims. (Cl. 182—63)

This invention relates to attachments for motor vehicles and more particularly to a scaffold attachment for a truck.

An object of this invention is to provide a scaffold attachment for a motor vehicle wherein the scaffold is rugged, steady and safe as a result of the structural arrangement of means to elevate, support and lower the scaffold platform.

A further object of the invention is to provide a truck with a number of posts whose upper extremities support a frame on which the scraffold platform rests when in the lowered position, the frame being considerably above the truck body surface in order to leave a considerable space for carrying tools, materials and other equipment and yet permit the scraffold to be properly elevated and lowered.

Another object of the invention is to provide a scaffold on a motor vehicle, especially a truck, where the main purpose for the scaffold is in the maintenance and repair of bridges, although the scaffold may be used for other purposes. In this regard, there is a scaffold platform having sides that are capable of folding to a down position on the platform and lateral extensions on the platform on which to support the weight of various objects or workers.

Another object of the present invention is to provide a scaffold capable of operation through a wide vertical range of heights, and in each position that is selected the scaffold is completely stable, never binding in any position nor dropping the slightest distance after locked in a selected position. This is achieved by a novel arrangement of supporting frames that are hingedly connected together and to the scaffold platform and to the motor vehicle body, combined with fluid actuated, extensible devices, as hydraulic cylinders, arranged operatively between the supporting frames for the scaffold platform and the hinge points of the lower extremity thereof, these hinge points being preferably on posts that are secured rigidly to the truck body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side view of the truck in Figure 1 with a scaffold in an elevated position;

Figure 6 is a sectional view taken approximately on the line 6—6 of Figure 2;

Figure 1:
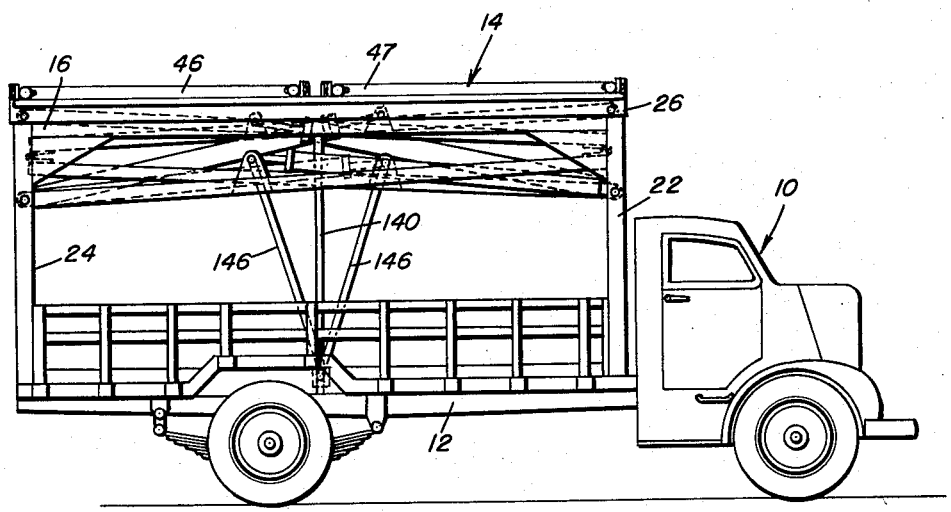
Figure 1 is a side view of a truck having a scaffold which exemplifies the invention in the lowermost position.

In the accompanying drawings there is a motor vehicle 10 capable of locomotion and having a body 12. This motor vehicle is of a standard description and has a scaffold attachment 14 built thereon. To do this, an upper, approximately rectangular frame 16, having cross member 18 at the center thereof, is mounted on four upright posts, two of them being indicated at 22 and 24 respectively. The other side of the truck 10 has identical posts that are unshown. The upper ends of the posts or the rectangular frame 16 constitutes a rest on which to support the scaffold platform 26 when in the lowered position (Figure 1).

Figure 3:
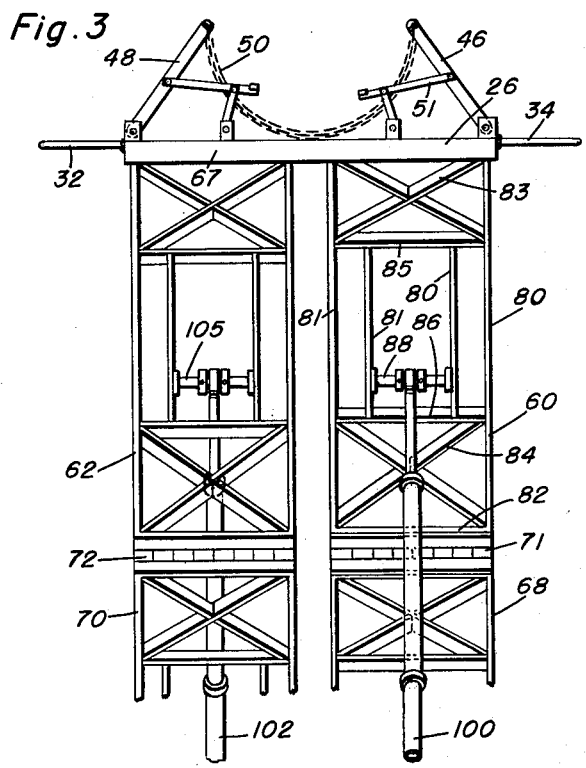
Figure 3 is a side view taken approximately on the line 3—3 of Figure 2.

The scaffold platform 26 is made of a floor 28 that is strongly and heavily reinforced, as at 30, in order that the platform be rigid. Laterally extending frames 32 and 34 are secured to the sides of the platform 26 and have bracing 36 between the frame and the platform. Wire mesh panels 38 and 40 are attached to the frames. A fence is hingedly connected to the platform 26, the fence consisting of two sides and each side having rectangular panels as at 46 and 47 (Figure 6). The panel 46 is connected to the panel 48 by means of a chain 50, the panel 48 being one of the pair on the opposite side of the platform (Figure 3). Locking linkages 51 and 52 are on opposite ends of panel 46, while locking linkages 53 and 54 are on opposite ends of panel 47. A similar arrangement of locking linkages is provided for the pair of panels on the opposite side of the platform 26. Accordingly, the panels that form the fence may be lifted manually and held in the upright position by means of the locking linkages. In so doing, the ends of the platform 26 are fenced by means of the two chains 50 which automatically are elevated with the lifting of the side panels 46, 47 and the two panels 48.

There are means operatively connected with the posts on the truck and the platform 26 for elevating the platform and for holding it in a selected position throughout the wide range of travel of the platform 26. These means consist of a first frame 60, together with a second frame 62. The upper extremities of frames 60 and 62 are connected by means of hinge pins 64 and 66 respectively to the depending skirt 67 of the platform 26, this skirt being a part of the reinforcing 30 and more particularly a part of the rectangular frame which forms a support for the floor 28. There are third and fourth frames 68 and 70 respectively that are connected at their outer ends by means of hinges 71 and 72 to the lower extremities of the frames 60 and 62. Frames 68 and 70 are mounted for pivotal movement on hinge pins 74 and 75 respectively, these hinge pins extending in a direction transverse to the longitudinal axis of the truck and carried by the fore and aft posts respectively on the truck body.

The specific structure of the first and second, or upper frames 60 and 62 is seen best in Figure 3. Frame 60 is made of sides 80 and 81, together with ends 82 which extend across and which are secured to the sides. An X-frame 83 is near one end of the frame 60 and an X-support frame 84 is near the lower end of the frame 60, these X-supports being spaced apart by transverse braces 85 and 86. The transverse braces have parallel braces 86 and 87 connected thereto and between which spindle 88 is fixed. Frame 62 is identical to and interchangeable with frame 60.

Figure 4:
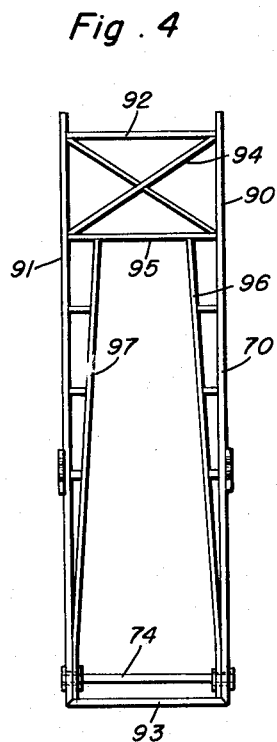
Figure 4 is an elevational view of one of the two lower scaffold platform supporting frames.
Figure 5:
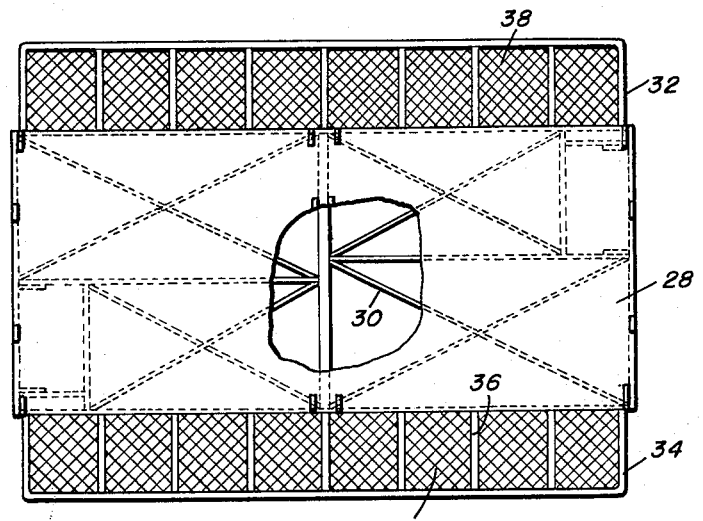
Figure 5 is a plan view of the scaffold platform with parts broken away to show otherwise hidden structure.

The lower frames 70 and 68 are typified in Figure 4 where the frame 70 is illustrated as having sides 90 and 91 connected by upper and lower frame members 92 and 93. An X-frame support 94 is at the upper end of frame 70 and there is a transverse brace 95 therebelow. Side trusses 96 and 97 extend from the transverse brace member 95 to the lower cross member 93.

The means for elevating the platform 26 also include the two motors 100 and 102, the motors being preferably fluid operated cylinders. The fluid operated cylinder 100, which constitutes an extensible means, has its lower extremity hinged on the pin 75 and its upper extremity mounted for pivotal movement on spindle 88 of frame 60. The cylinder 102 has its lower extremity mounted on pin 76 and its upper extremity mounted on spindle 105 which occupies a position in frame 62 similar to the spindle 88 in frame 60. Hydraulic cylinders 106 and 108 are each mounted on the same pivots 75 and 74 as the third and fourth frames 68 and 70 and the cylinders 100 and 102. The opposite ends of the hydraulic cylinders 106 and 108 are mounted pivotally on spindles 112 and 114 respectively, which are supported by mounting brackets 116 and 118 carried by the lower frames 68 and 70.

Figure 7:
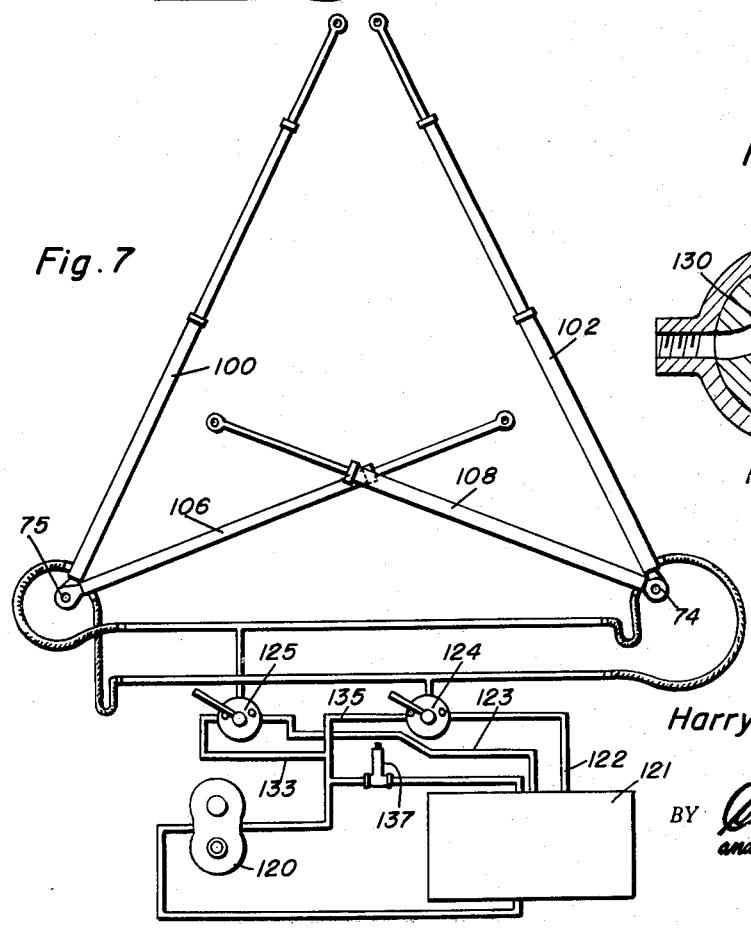
Figure 7 is a schematic view of the hydraulic system that is a part of the scaffold in Figures 1 and 2.
Figure 8:
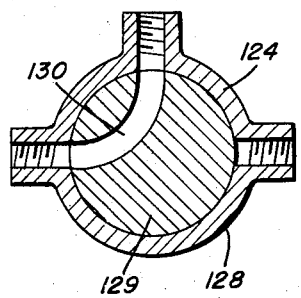
Figure 8 is an enlarged sectional view of one of the control valves in the hydraulic system of Figure 7.

The fluid flow system is schematically represented in Figure 7. It includes a fluid pump 120 connected to a pressure tank 121. Fluid lines 122 and 123 extend from the pressure chamber 121 and connect with the manually operated valves 124 and 125. Each valve is of similar construction, including a valve body 128 having a valve core 129 therein with a passage 130 that intercommunicates respectively the inlet line with the return lines 133 and 134 and 135, depending on whether valve 124 or valve 125 is considered. The return lines 133 and 135 have connection with pump 120 and tank 121, there being a safety valve 137 in one of the return lines and exposed to the pressure in the tank 121. With the described and illustrated system, the cylinders may be extended or permitted to lower upon manipulation of the three-way valves 124 and 125 respectively.

A vertical column 140 is attached to the bottom 142 of the truck body and to the cross member 18 of frame 16. A collar 144 is slidable on the column 140 and has links 146 and 148 pivoted thereto. The upper ends of the links are pivoted to the pivot pins or spindles 112 and 114 for the cylinders 106 and 108 respectively. Therefore, the sliding collar 144 moves upwardly and downwardly in accordance with the raising and lowering of the platform 26 and functions as a guide and support for the scaffold raising and lowering means.

In operation, the valves 124 and 125 are actuated in order to extend the hydraulically actuated extensible means to raise the platform 26. By opening the valves, fluid under pressure is applied to the four hydraulic cylinders (Figure 7), thereby hingedly actuating the upper and lower frames. This moves the platform vertically. By having hydraulic control, precise elevations of the platform 26 may be obtained and held. When the job is completed, the hydraulic valves 124 and 125 are turned to the proper position to allow the fluid from the hydraulic cylinders to return into the hydraulic system. Accordingly, the platform 26 is gravity lowered until it comes to rest on the upper ends of the posts on the truck body or on the frame which is connected to the posts. Then the truck is ready for transportation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motor vehicle body, a plurality of posts, a cross member and frame attached to said posts, a platform adapted to be raised and lowered, a pair of frames hinged to said platform and crossed intermediate their ends, a second pair of frames connected to the ends of said first pair of frames and also crossed, said second pair of frames being pivotally secured to said posts, a hydraulic cylinder attached to each of said first pair of frames intermediate the ends of each and pivotally secured to said posts on the same pivot point as said frames, a second pair of hydraulic cylinder also pivoted on said same pivot point and pivoted to each of said second pair of frames intermediate the ends thereof, and guide means connected to said second pair of frames for stabilizing said frames as they are raised and lowered.

2. In combination with a motor vehicle body, a plurality of posts, a cross member and frame attached to said posts, a platform adapted to be raised and lowered, a pair of frames hinged to said platform and crossed intermediate their ends, a second pair of frames connected to the ends of said first pair of frames and also crossed, said second pair of frames being pivotally secured to said posts, hydraulic cylinders attached to said first pair of frames intermediate the ends of each and pivotally secured to said posts on the same pivot point as said second pair of frames, a second pair of hydraulic cylinders also pivoted on said same pivot point and pivoted to said second pair of frames intermediate the ends thereof, and guide means connected to said second pair of frames for stabilizing said frames as they are raised and lowered, said guide means including a plurality of links pivoted to said second frames, a column carried by said body, a collar slidably disposed on said column and pivotally attached to said pair of links.

References Cited in the file of this patent

UNITED STATES PATENTS

| | | |
|---|---|---|
| 956,189 | Schwarz | Apr. 26, 1910 |
| 1,630,191 | Liberman | May 24, 1927 |
| 1,817,418 | Munns | Aug. 4, 1931 |
| 2,471,901 | Ross | May 31, 1949 |
| 2,778,694 | Mitchell | Jan. 22, 1954 |

FOREIGN PATENTS

| | | |
|---|---|---|
| 1,105,296 | France | June 29, 1955 |